(12) United States Patent
Whaley

(10) Patent No.: US 7,234,480 B2
(45) Date of Patent: Jun. 26, 2007

(54) TELESCOPIC SNAP VALVE

(75) Inventor: Robert E. Whaley, Cocoa Beach, FL (US)

(73) Assignee: Atlantic Plastics of Florida, Inc., Winchendon, MA (US)

( * ) Notice: Subject to any disclaimer, the term of this patent is extended or adjusted under 35 U.S.C. 154(b) by 284 days.

(21) Appl. No.: 10/944,378

(22) Filed: Sep. 17, 2004

(65) Prior Publication Data

US 2006/0060247 A1 Mar. 23, 2006

(51) Int. Cl.
*F16K 15/04* (2006.01)
*B65D 77/06* (2006.01)

(52) U.S. Cl. .............................. 137/15.18; 137/533.15; 137/515; 137/515.5; 137/539; 222/105

(58) Field of Classification Search ........... 137/533.11, 137/533.13, 533.15, 515, 515.5, 15–18, 539; 222/105; 285/921; 251/143, 148
See application file for complete search history.

(56) References Cited

U.S. PATENT DOCUMENTS

| | | | |
|---|---|---|---|
| 3,799,194 A | 3/1974 | Bedo | |
| 3,894,556 A | 7/1975 | Pareja | |
| 3,916,496 A | 11/1975 | Freiheit | |
| 4,100,928 A | 7/1978 | Schoepe | |
| 4,287,912 A | 9/1981 | Hewett | |
| 4,512,360 A | 4/1985 | Chronister | |
| 4,665,940 A | 5/1987 | Jacobson | |
| 4,934,408 A | 6/1990 | Christopherson | |
| 5,275,196 A | 1/1994 | Mitchell | |
| 5,332,001 A | 7/1994 | Brown | |
| 5,390,814 A * | 2/1995 | Christine et al. | ............ 222/105 |
| 5,556,005 A * | 9/1996 | Banks | .......................... 222/96 |
| 5,558,121 A | 9/1996 | Webster | |
| 5,749,494 A | 5/1998 | Wolski | |
| 5,975,164 A * | 11/1999 | Whaley et al. | ............. 141/351 |
| 6,561,386 B1 | 5/2003 | Martens | |
| 6,837,479 B2 * | 1/2005 | Symonds, Jr. | ........... 251/149.5 |

FOREIGN PATENT DOCUMENTS

| | | |
|---|---|---|
| GB | 2172063 | 9/1986 |
| GB | 2388365 | 11/2003 |

* cited by examiner

*Primary Examiner*—Ramesh Krishnamurthy
(74) *Attorney, Agent, or Firm*—Brian S. Steinberger; Law Offices of Brian S. Steinberger, P.A.

(57) ABSTRACT

A telescopic snap valve assembly and method of assembling a snap valve with a liquid holding bag in a box fitting. The valve assembly includes a valve member having a lower protruding telescopic end with a raised exterior lower edge. The telescopic end of the valve member is inserted into the center opening of the fitting so that the raised exterior lower edge snaps outward and protrudes from the bottom of the fitting locking the valve member to the fitting. Tight fitting between the telescopic end of the valve and the fitting, with or without a seal member such as O-ring, and the like further seal the valve member to the fitting so that no liquid becomes trapped and/or leaks from the assembly. The assembly can use a ball check valve, and can dispense all types of liquids and fluids such as but not limited to juice with pulp without clogging the valve.

17 Claims, 6 Drawing Sheets

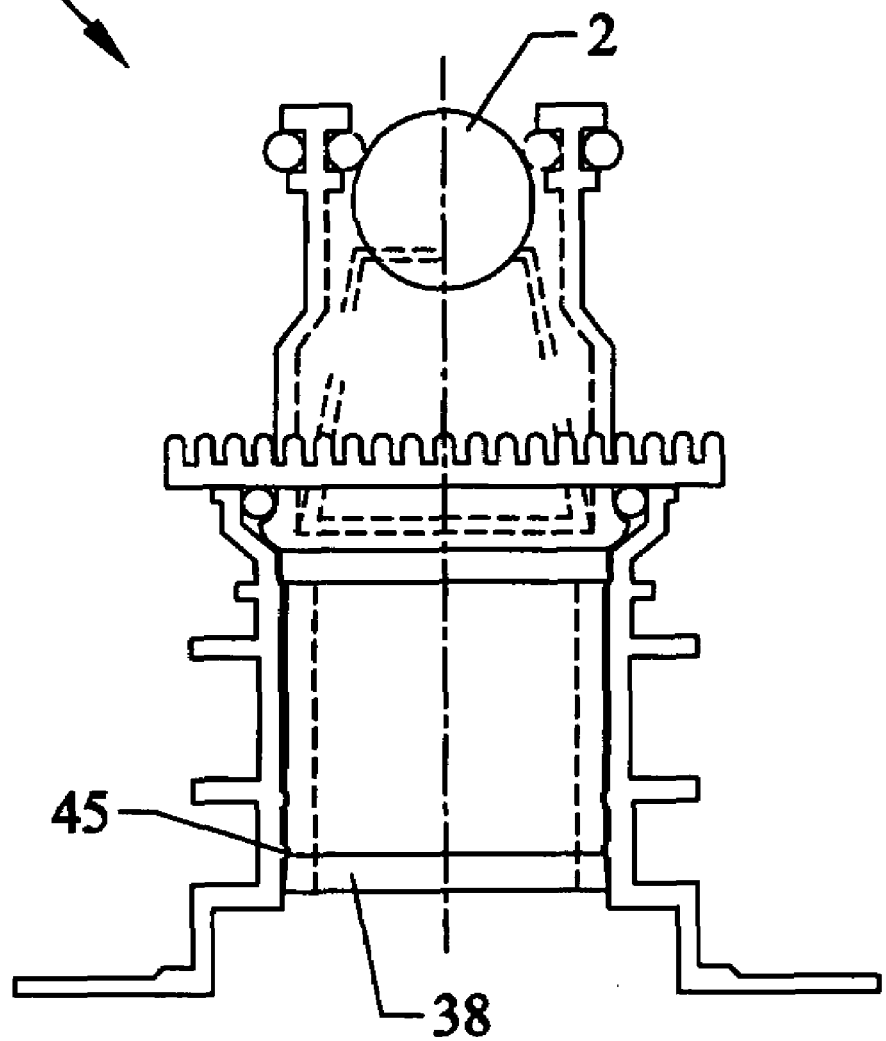

TELESCOPIC SNAP VALVE

This invention relates to a valve assembly, in particular to a valve assembly for use with a bag in a box type container for holding liquid having a ball check valve with telescoping snap-in connection end.

BACKGROUND AND PRIOR ART

Dispensing liquid such as juices, liquid soap, industrial oil, and the like, from bags within box containers has been used for many years with vending type machines, and are known to have problems. For example, the small exit ports from the liquid filled bags have been known to become clogged over time with substances such as juice pulp, and the like. Various types of valves have been proposed over the years to correct this problem such as using ball check valves, and the like. See for example, FIGS. 1A and 1B, and U.S. Pat. No. 5,975,164 to Whaley et al., and U.S. Pat. No. 6,561,386 to Martens.

FIG. 1A is an exploded view of a prior art ball check valve assembly 1. FIG. 1B is an assembled view 1' of the prior art ball check valve assembly of FIG. 1A.

Referring to FIGS. 1A–1B, a prior art ball check valve assembly 1, 1' has been used in the past several years as a dispenser head for bags in boxes that were used to dispense watery fluids such as iced tea, and the like. Inside a narrow diameter chamber 14, a ball 2 is held place under an upper plate portion 12. An external O-ring 13 is held in place between upper plate portion 12 and annular member 11. Chamber 14 has a diameter of approximately 8/10 of an inch which expands outward from sidewall 16 to an enlarged chamber 18 having a diameter of approximately 9/10 of an inch. An outer annular rim separates the chamber 14 from a lower extending chamber section 30 having a length of approximately 1 & 1/10 inches long and has a ridge 38 along its' lower end with an downwardly expanding edge.

The prior art valve assembly has limited use for several reasons. The narrow dispensing chamber portion 14 with a constricting interior passageway is only able to dispense watery type fluids such as iced tea, and the like, and also fluids that have a greater viscosity. More dense fluids such as juices with pulp are not able to pass through this narrow diameter chamber. In addition, the extra manufacturing needed to make the valve body 10 to have a narrowing diameter upper end, and raised surface portions and extra costs to allow for two O-rings is not an easy to make and is costly to produce.

Still furthermore, the fitting 40 used in the prior art ball check valve is not able to be used with different types of bags in a box that are used in vending machines, and the like, such as bags holding juice, and the like, which can not have a fitting with a long length as used in the prior art shown in FIGS. 1A and 1B.

In addition, the raised ridge 38 shown on chamber section 30 is difficult to push into the fitting 40. The interior shoulder protrusion 45 inside of chamber section 30 causes the ridge 38 to be basically wedged in place, and subject to the valve 10 being able to potentially separate from the fitting 40. Also, the combination of both the raised ridge 38 and the interior shoulder protrusion causes a gap between the exterior of chamber section 30 and the interior of fitting 40. Such a gap space can cause liquid from the bag to become trapped therebetween. Even with upper O-ring 25, a potential leak of fluid from outside the valve assembly 1' can occur as well.

U.S. Pat. No. 6,561,386 to Martens describes a "Ball Check Valve Assembly", title, for use with a bag in a box application, having a narrow depth "U-shaped" collar pre-attached to a ball valve that must be top mounted over a raised stem section that is attached to the liquid bag. However, this assembly has problems. The inside of the U-shaped portion is no greater than approximately 2/10 of an inch in depth. The shallow depth of this top mounted collar is clearly prone to accidentally falling off and separating from the stem section if the valve member is accidentally hit sideways. Since the bag is usually filled with liquid, such as juice, knocking the valve member off the stem portion can result in a disastrous loss of juice from the bag, which can result in a mess and possibly ruining the assembly and anything else in proximity such as the vending equipment itself. Thus, this assembly tends to not be stable and reliable when used.

In addition, the Marten's apparatus requires two separate ring shaped raised ridge surfaces in order to attach the collar to the stem section. These raised surfaces create extra complications that require additional molding work, and special tolerances and costs associated with the mold to make the assembly work.

The inventor is also aware of other U.S. patents. See for example, U.S. Pat. No. 3,799,194 to Bedo et al.; U.S. Pat. No. 3,894,556 to Pareja; U.S. Pat. No. 3,916,496 to Freiheit; U.S. Pat. No. 4,100,928 to Schoepe; U.S. Pat. No. 4,287,912 to Hewett; U.S. Pat. No. 4,512,360 to Chronister; U.S. Pat. No. 4,665,940 to Jacobson; U.S. Pat. No. 4,934,408 to Christopherson; U.S. Pat. No. 5,275,196 to Mitchell et al.; U.S. Pat. No. 5,558,121 to Webster et U.S. Pat. No. 5,332,001 to Brown; and U.S. Pat. No. 5,749,494 to Wolski et al. In addition, the inventor is aware of UK patent Applications: GB 2,172,063 and GB 2,338,365, However, none of these patent references overcome all the problems referenced above.

Thus, the need exists for solutions to the above problems with the prior art.

SUMMARY OF THE INVENTION

A primary objective of the present invention is to provide a telescopic snap valve assembly and assembly method for dispensing liquid from bags in boxes where the ball check valve portion with an easy to secure telescopic snap valve connection.

A secondary objective of the present invention is to provide a telescopic snap valve assembly and assembly method for dispensing liquid from bags in a box where the valve member is inserted into the fitting and results in a stable, reliable connection that is not prone to being separated and dislodged from the valve stem portion that is connected to the bag.

A third objective of the present invention is to provide a telescopic snap valve assembly and assembly method for dispensing liquid from bags in boxes where the telescopic snap connection accomplished by only a single raised surface edge resulting in easier to make molds and lower costs to manufacture.

A fourth objective of the present invention is to provide a telescopic snap valve assembly and assembly method for dispensing non watery thicker liquids such as juice with pulp, therefrom, without clogging the dispensing end of the valve.

A fifth objective of the present invention is to provide a telescopic snap valve assembly and assembly method for dispensing liquid that becomes sealed in such a way to reduce leaks, and the like, by eliminating gap spaces between components where liquid can flow, become trapped, and potentially leak out therefrom.

A preferred assembled embodiment of the invention can include a fitting on a liquid holding container, the fitting having a through-hole therethrough between and upper end and a lower end, and a valve member having a lower protruding telescopic end with a raised ridge edge, the lower protruding end for telescoping into the upper end of the fitting so that the raised ridge edge protrudes under and about the lower end of the fitting, wherein the valve assembly is used for dispensing liquid from the liquid holding container.

The invention can be used with a bag in a box wherein the fitting is between the bag and the box. The valve member can be a ball check valve end opposite to the lower protruding end.

The lower protruding telescopic end can be at least approximately ½ inch in length, and the through-hole in the fitting and the lower protruding end of the valve member both have a cylindrical configuration.

The valve member can have an annular rim with a ledge portion which rests against the upper end of the fitting. A seal member such as an O-ring can be located between the ledge portion and the upper end of the fitting.

The raised ridge edge of the telescopic end of the valve member can have an inwardly sloping angled lower surface portion for directing the telescopic end of the valve member into the through-hole of the fitting, and an upper catch surface portion for snapping outward under the lower end of the fitting for locking the valve member to the fitting. A seal member such as an O-ring can be used for sealing the valve member to the fitting.

A method of assembling a valve member into a bag in a box fitting can include the steps of telescopically inserting a protruding portion of a valve member into a through-hole opening of the fitting to the bag located in the box, and snapably expanding a raised edge portion on a lower end of the protruding portion of the valve member underneath the fitting to lock the valve member to the fitting. The valve member can be sealed to the fitting by compressing an O-ring between a ledge portion on the valve member and a shoulder portion on the fitting.

Further objects and advantages of this invention will be apparent from the following detailed description of the presently preferred embodiments which are illustrated schematically in the accompanying drawings.

BRIEF DESCRIPTION OF THE FIGURES

FIG. 1B is an assembled view of the prior art ball check valve assembly of FIG. 1A.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

Figure 2:
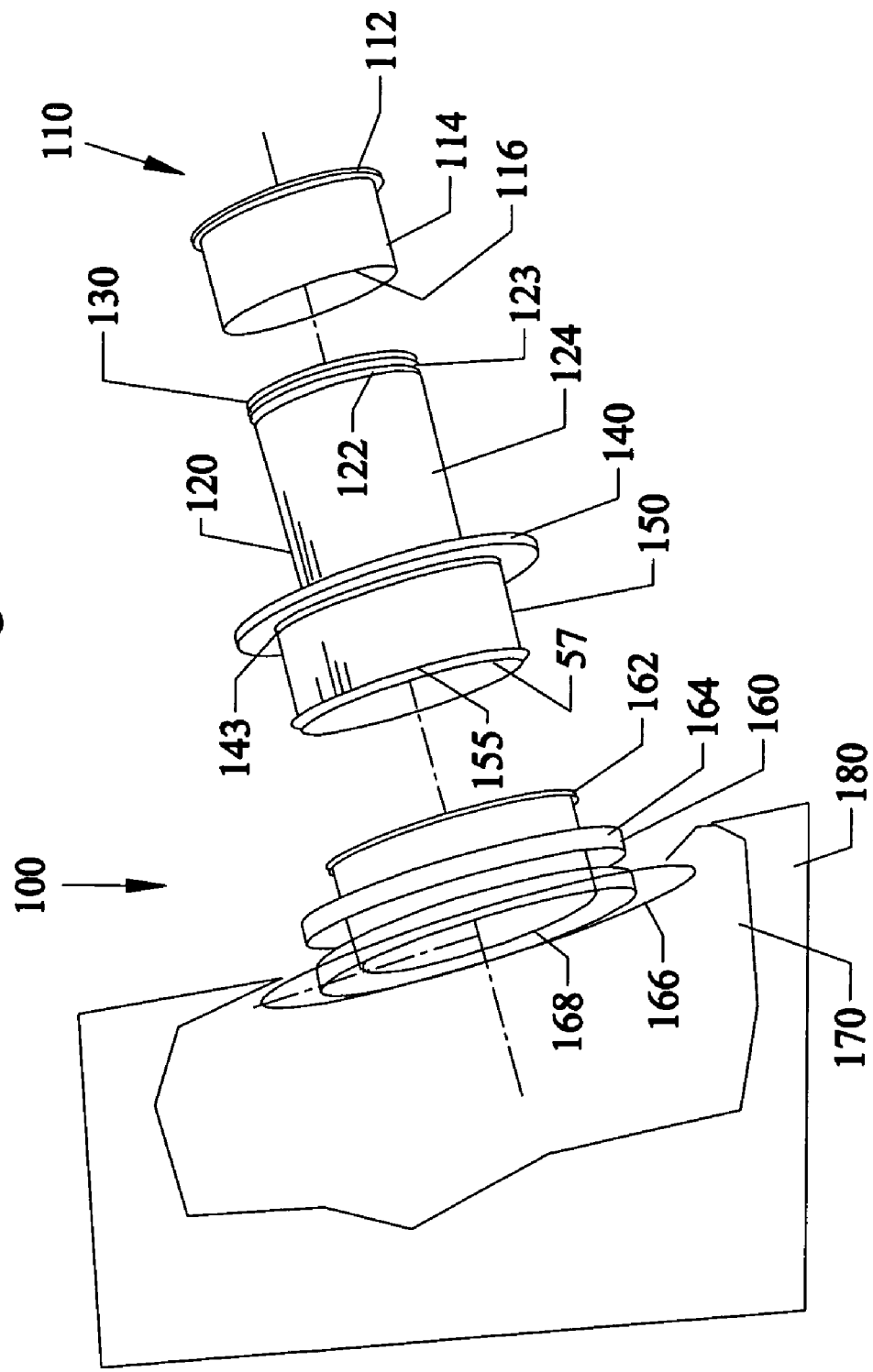
FIG. 2 is an exploded perspective view of the telescopic snap valve assembly with cap cover, ball check valve with telescopic snap-in end and bag in a box fitting for receiving the telescopic snap-in end.

The main components in the figures are labeled as follows:
1 Prior Art Valve Assembly Unassembled
1' Prior Art Valve Assembly Assembled
2 Ball
10 Ball Check Valve
12 Upper flat end top of valve 10
13 Outer O-ring about nozzle end
14 Narrow diameter upper ball holding chamber
15 Inner O-ring to hold ball 10 in place
16 outwardly expanding sidewall from narrow diameter chamber
20 outer annular rim
30 lower extending chamber section
32 upper stop
38 downwardly expanding catch
40 elongated fitting
44 upper rim member
46 lower rim member
45 inside chamber shoulder protrusion
48 bottom end of lower chamber section
100 Telescopic Snap Valve Assembly unassembled
100' Telescopic Snap Valve Assembly fully assembled
110 Cap cover
112 closed lid top
114 cylindrical sides
116 bottom end
120 Ball Check Valve
122 annular walls for O-ring
123 seal member O-ring
130 Upper cylinder liquid dispensing end of Ball Check Valve
131 top end
132 interior ridge
134 moveable ball
136 compressed coil spring
138 ledge portion
140 Annular Rim
142 upper shoulder portion
143 seal member O-ring
146 annular groove
148 lower ledge portion 48
150 Telescoping End
154 raised ridge edge
155 upper catch surface portion
157 inwardly sloping angled lower surface portion
160 Bag in a Box Fitting
162 upper end edge
164 annular rim member
165 through-hole
166 annular rim member
168 lower end
170 Bag
180 Box FIG. 2 is an exploded perspective view of the telescopic snap valve assembly 100 with cap cover 110, ball check valve 120 with telescopic snap-in end 150 and bag 170 in a box fitting 160 for receiving the telescopic snap-in end 150.

Figure 3:
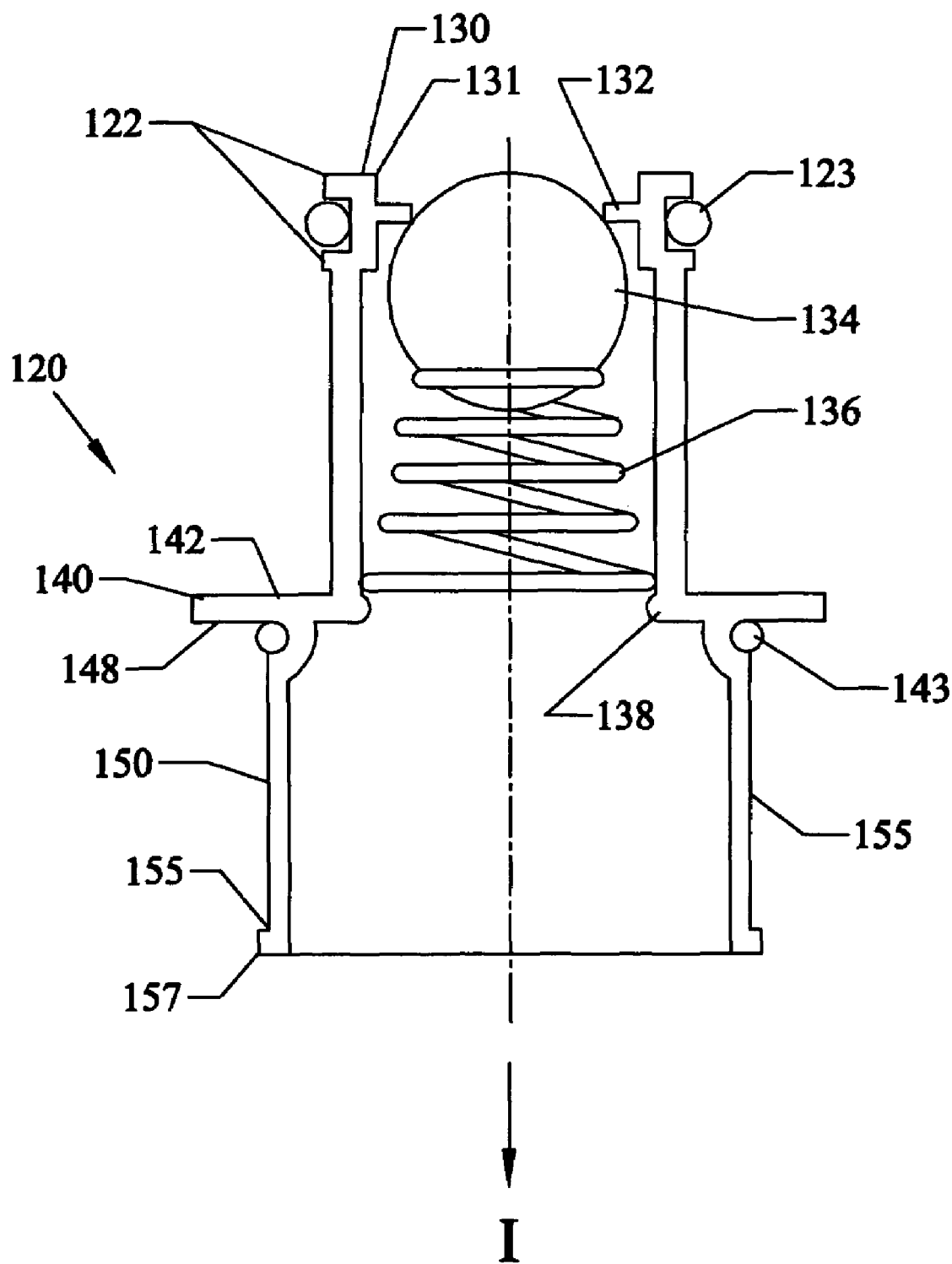
FIG. 3 is a side cross-sectional view of the bag in a box fitting of FIG. 2.
Figure 4:
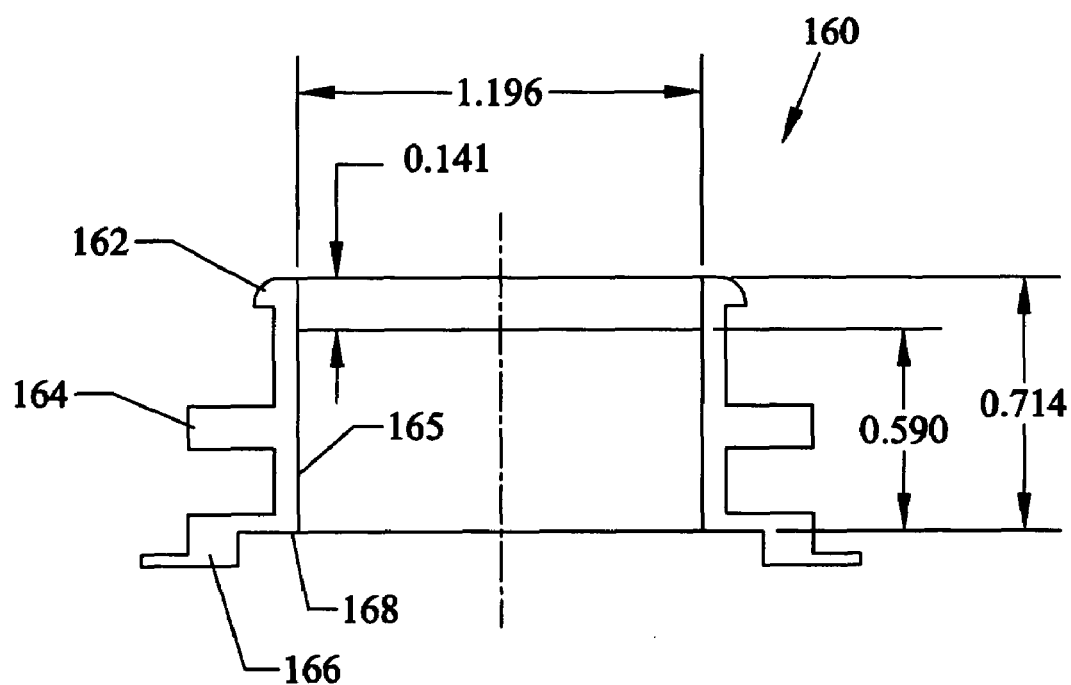
FIG. 4 is a side cross-sectional view of the valve with telescopic snap-in end of FIG. 2.
Figure 5:
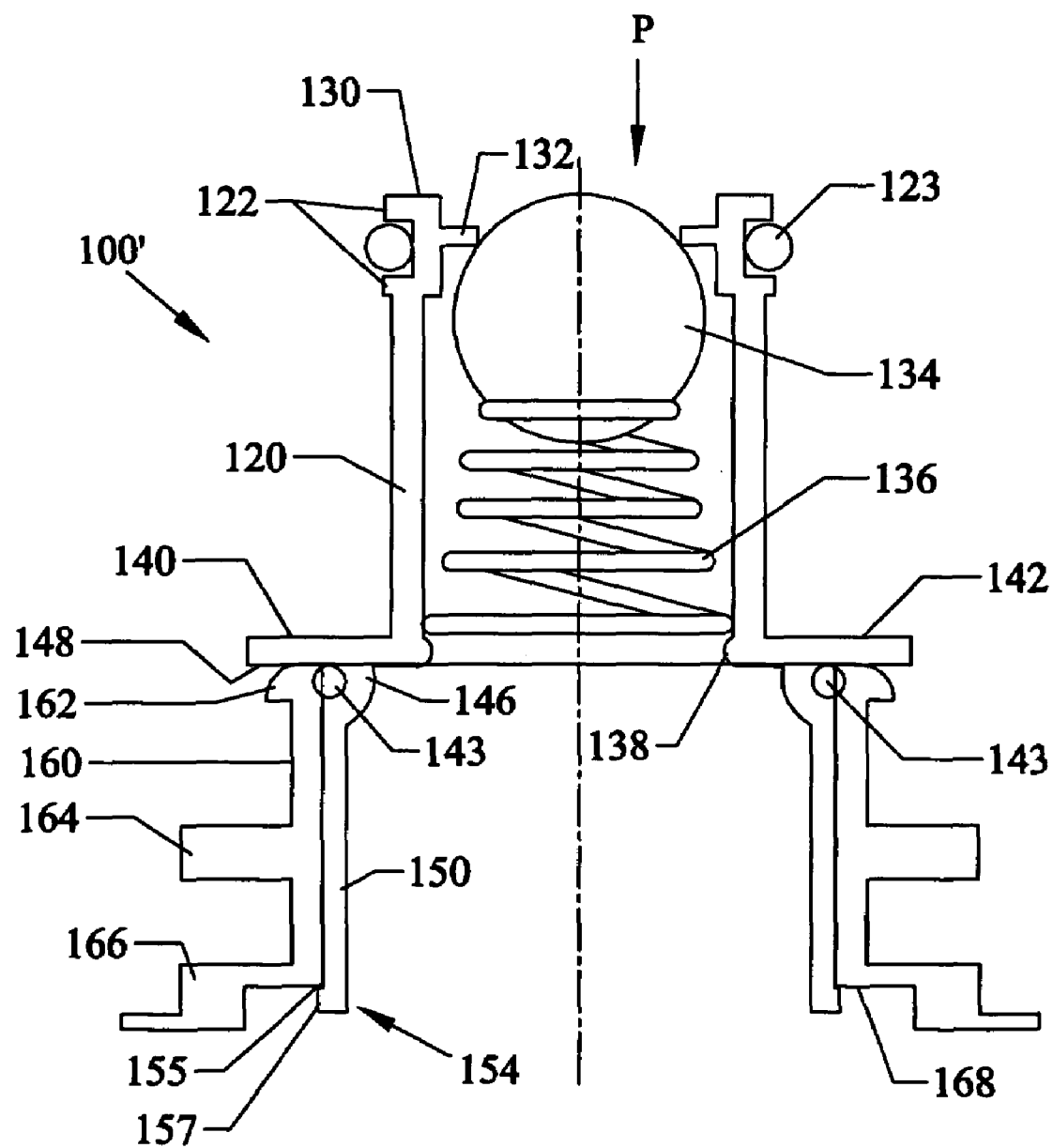
FIG. 5 is a side cross-sectional view of the ball check valve with telescopic snap-in end interconnected with the bag in a box fitting of the preceding figures.

FIG. 3 is a side cross-sectional view of the bag in a box fitting 160 of FIG. 2. FIG. 4 is a side cross-sectional view of the valve 120 with telescopic snap-in end 150 of FIG. 2. FIG. 5 is a side cross-sectional assembled view 100' of the ball check valve 120 with telescopic snap-in end 150 interconnected with the bag 170 in a box fitting 160 of the preceding figures.

Unlike the prior art valve members, the novel invention can dispense many various types of fluids having different viscosities, different textures, different densities, and the like.

Referring to FIGS. 2–5, the bag 170 in the box 180 can be used to hold and dispense many various types of liquid such as but not limited to juice with or without pulp, liquid soap, industrial oil, and the like.

The subject invention can be used with dispensing all types of fluids, and also can be placed in vending machines and the like, such as those shown and described in reference to U.S. Pat. No. 5,975,164 to Whaley et al., and U.S. Pat. No. 6,561,386 to Martens, both of which are incorporated by reference.

The cap cover 110, valve member 120 and fitting 160 can be made and/or molded from a suitable synthetic resin material, such as but not limited to polyethylene, polypropylene, and the like. The seal members such as the O-ring components referenced in the figures can be formed from suitable material, such as but not limited to neoprene, rubber, and the like.

A preferred embodiment of the cap cover 110 can have a closed lid top 112 and cylindrical sides 114 having a snap fitting with bottom end 116, the latter of which can cover and close off the liquid dispensing end 130 of ball check valve member 120. The cap cover 110 is used from the time the bag is being filled, through storage until it is placed in the vending machine. The purpose of the cap cover 110 is for sanitary purposes and to limit the amount of air entering the bag and destroying the liquid contents, until the bag in a box is being used.

The novel ball check valve member 120 can have an upper dispensing end 130, and inside having an interior ridge 132 for holding a moveable ball 134, which is pressed upward from a compressed coil spring 136 that is supported by a ledge portion 138 inside of the upper end 130 of the valve member 120. About the upper end 130 of the valve member can be an O-ring 123 having a wall thickness diameter of approximately 0.105 inches that is positioned between annular walls 122, where the O-ring provides a seal against liquid leakage between the valve member 120 and the cap cover 110.

The dispensing end 130 of the cylindrical upper end 130 of the valve member 120 can have a hollow interior diameter of slightly greater than approximately 0.5 inches while the moveable ball 134 can have a diameter of approximately 0.5 inches. This sizing can allow that the ball 134 can move inside the cylindrical space of upper end 130 of the valve member 120, and the length of the upper end 130 of the valve member 120 can be approximately 1.19 inches from the annular rim 140 to the top end 131 of valve member 120.

The annular rim 140 can extend about a mid portion of valve member 120 and have an upper shoulder portion 142 and lower ledge portion 148, with an annular groove 146 underneath the inside of the lower ledge portion 148 for supporting another seal member 143 such as but not limited to an O-ring therein.

The valve member 120 has a lower facing extending hollow telescopic end 150 protruding beneath the annular rim 140 that can have an outer diameter of slightly less than approximately 1.196 inches and having a length of greater than approximately 0.590 inches.

A raised ridge edge 154 on the bottom of the telescopic end 150 can have an inwardly sloping angled lower surface portion 157 for directing the telescopic end 150 of the valve member 120 in the direction of arrow I (FIG. 2) into the through-hole 165 of the fitting 160 (FIG. 3). The raised ridge 154 can have an upper catch surface portion 155 that can have a generally horizontal surface for snapping outward under the lower end 168 of the fitting 160 for locking the valve member 120 to the fitting 160. The raised ridge 154 becomes a retainer for literally locking the valve member 120 to the fitting 160 and unlike the prior art cannot become easily dislodged and separated therefrom.

The fitting 160 can be pre-attached to the liquid filled bag 170 that is located within a box 180 that is used with vending type machines such as those described in the background portion of the invention. The fitting 160 can be sealing attached to the bag 170 by being sandwiched between annular rim members 164, 166. The telescopic end 150 is sealed with the valve member 120 by the O-ring 143 having a ring diameter of approximately 0.070 inches which becomes compressed between upper end edge 162 having a thickness of approximately 0.141 inches of the fitting 160 and the ledge portion 148 of annular rim 140.

In operation pushing the ball 134 inward in the direction of arrow P while the dispensing end 130 is placed upside down allows liquid to exit from the valve member 20.

The tight fitting of the valve member into the fitting does not have any unnecessary gap spaces that can cause liquid to become trapped, and lost, and/or potentially leak out therefrom.

Figure 1A:
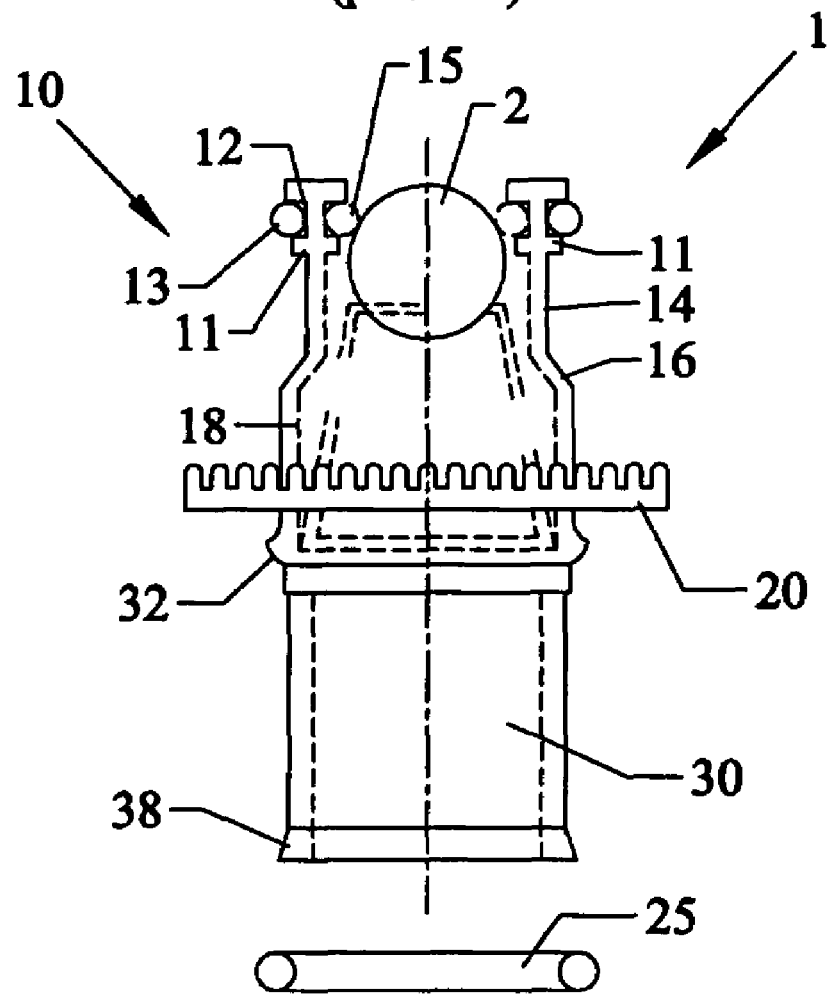
FIG. 1A is an exploded view of a prior art ball check valve assembly.
Figure 1A:
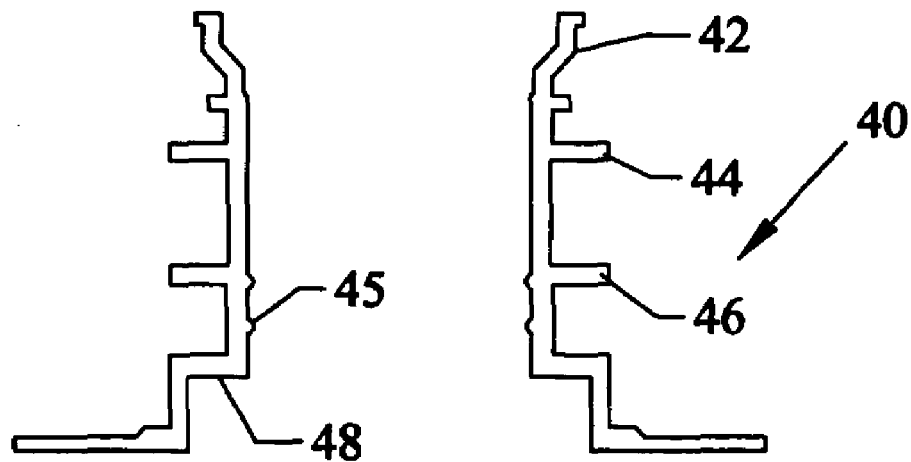

The shaped raised ridge on the telescopic end of the valve member secures in place underneath the fitting causing a more stable lock that is not prone to separate as can occur with the valves shown and described in reference to FIGS. 1A and 1B.

The mold used to form the valve member and the fitting used in the invention would be easier and less costly to produce and uses less parts (at least one less O-ring) than that shown and used with the prior art of FIGS. 1A and 1B.

While the raised ridge edge of the telescoping end of the valve member is completely and continuously surrounds the telescoping end, the raised ridge edge can be formed from separate pieces such as one, two or more tab sections spaced apart from one another as needed.

Although the telescoping end of the valve member and the fitting opening are shown to be cylindrical, other shapes such as square, rectangular, triangular, hexagon, and the like, can be used for locking the telescoping end to the fitting.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A valve assembly, comprising:
   a fitting on a liquid holding container, the fitting having a through-hole therethrough between an upper end and a lower end, the lower end having a ledge portion;
   a valve member having a lower protruding telescopic end with a raised ridge edge, the lower protruding end for telescoping into the upper end of the fitting so that the raised ridge edge protrudes underneath and below the ledge portion of the lower end of the fitting, wherein the valve assembly is used for dispensing liquid having different viscosities, densities and textures from the liquid holding container, wherein the raised ridge edge of the telescopic end further includes:

an inwardly sloping angled lower surface portion for directing the telescopic end of the valve member into the through-hole of the fitting; and an upper catch surface portion for snapping outward under the lower end of the fitting for locking the valve member to the fitting.

2. The valve assembly of claim 1, wherein the liquid holding container includes:

a bag in a box wherein the fitting is between the bag and the box.

3. The valve assembly of claim 1, wherein the lower protruding telescopic end is at least approximately ½ inch in length.

4. The valve assembly of claim 1, the valve member further comprising:

an upper chamber housing a valve, the upper chamber having a continuously cylindrical and uniform diameter interior diameter; and an annular rim about the valve member for separating the upper chamber from the lower protruding end of the valve member.

5. The valve assembly of claim 1, wherein the valve member includes:

a ball check valve end opposite to the lower protruding end, and a single O-ring adjacent to an upper edge of the ball check valve end.

6. The valve assembly of claim 5, wherein the valve member includes:

an annular rim having a ledge portion which rests against the upper end of the fitting.

7. The valve assembly of claim 6, further comprising:

a seal member between the ledge portion and the upper end of the fitting.

8. The valve assembly of claim 7, wherein the seal member includes:

an O-ring.

9. The valve assembly of claim 1, further comprising:

a seal member for sealing the valve member to the fitting.

10. The valve assembly of claim 9, wherein the seal member includes:

an O-ring.

11. The valve assembly of claim 1, further comprising:

a removable cap cover for covering an open end of the valve member.

12. A telescopic snap valve assembly for a bag in a box, comprising:

a fitting on the bag, the fitting having a through-hole therethrough between an upper end and a lower end, the lower end having a ledge portion;

a valve member having a dispensing end and a lower protruding telescopic end;

a raised ridge portion along a bottom outer edge of the telescopic end of the valve member, the raised ridge portion having an angled lower surface portion for directing the telescopic end of the valve member into the through-hole of the fitting, and an upper retainer portion for snapping outward underneath and below the ledge portion of the lower end of the fitting for locking the valve member to the fitting, wherein the valve assembly is used for dispensing liquid from the dispensing end of the bag.

13. The telescopic snap valve assembly of claim 12, wherein the valve member includes an annular rim having a ledge portion which rests against the upper end of the fitting, and a seal member being located between the ledge portion and the upper end of the fitting.

14. The telescopic snap valve assembly of claim 12, wherein the telescopic end of the valve member includes a length of at least approximately ½ inch long.

15. The telescopic snap valve assembly of claim 14, wherein the dispensing end of the valve member includes:

a ball check valve with a single O-ring adjacent to the valve.

16. A method of assembling a valve member into a bag in a box fitting, comprising the steps of:

telescopically inserting a protruding portion of a valve member into a through-hole opening of the fitting to the bag located in the box, the fitting having an upper end and a lower end, the lower end having a ledge portion; and expanding a raised edge portion on a lower end of the protruding portion of the valve member underneath the ledge portion of the fitting to lock the valve member to the fitting;

directing the telescopic end of the valve member into the through-hole of the fitting by an inwardly sloping angled lower surface portion on the raised ridge edge; and snapping outward an upper catch surface portion of the raised ridge edge portion under the lower end of the fitting for locking the valve member to the fitting.

17. The method of claim 16, further comprising the step of:

sealing the valve member to the fitting by compressing an O-ring between a ledge portion on the valve member and a shoulder portion on the fitting.

* * * * *